(12) United States Patent
Yushiya

(10) Patent No.: US 8,081,761 B2
(45) Date of Patent: Dec. 20, 2011

(54) COMMUNICATION ENCRYPTION PROCESSING APPARATUS

(75) Inventor: Akihiko Yushiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 935 days.

(21) Appl. No.: 11/832,507

(22) Filed: Aug. 1, 2007

(65) Prior Publication Data

US 2008/0260163 A1 Oct. 23, 2008

(30) Foreign Application Priority Data

Aug. 8, 2006 (JP) ................... 2006-215965

(51) Int. Cl.
*G06F 21/00* (2006.01)
(52) U.S. Cl. ......... 380/279; 380/280; 380/281; 380/282
(58) Field of Classification Search .............. 380/279
See application file for complete search history.

(56) References Cited

U.S. PATENT DOCUMENTS

| | | | | |
|---|---|---|---|---|
| 6,061,791 A | * | 5/2000 | Moreau | 713/171 |
| 6,105,134 A | * | 8/2000 | Pinder et al. | 713/170 |
| 6,215,877 B1 | * | 4/2001 | Matsumoto | 380/277 |
| 6,490,685 B1 | * | 12/2002 | Nakamura | 713/193 |
| 2005/0185790 A1 | * | 8/2005 | Le Quere | 380/28 |

FOREIGN PATENT DOCUMENTS

| JP | 09-258977 A | 10/1997 |
|---|---|---|
| JP | 2004-266360 A | 9/2004 |
| JP | 2006-191207 A | 7/2006 |

* cited by examiner

*Primary Examiner* — David García Cervetti
*Assistant Examiner* — Ghazal Shehni

(57) ABSTRACT

A communication encryption processing apparatus is provided in which a dedicated signal line is provided between a key management module and an encryption and decryption processing module to perform a key delivery via the dedicated signal line from the key management module to the encryption and decryption processing module, and as a result, transmission and reception of raw key data on a bus is no longer performed.

3 Claims, 14 Drawing Sheets

FIG. 2

| ENTRY NUMBER | ACTIVATION FLAG | IDENTI-FIER | CIPHER SUITE |
|---|---|---|---|
| 0 | REGISTERED | 0x5f | DES HMAC-SHA1 |
| 1 | REGISTERING | 0x10 | DES HMAC-SHA1 |
| 2 | INITIALIZED | 0x3a | DES HMAC-MD5 |
| 3 | INITIALIZED | | |
| 4 | REGISTERED | 0x68 | DES HMAC-MD5 |
| 5 | INITIALIZED | 0xe9 | DES HMAC-SHA1 |
| 6 | REGISTERED | 0x74 | DES HMAC-MD5 |
| 7 | REGISTERED | 0xd2 | DES HMAC-SHA1 |

FIG. 3

| ADDRESS | ENTRY NUMBER | CIPHER SUITE |
|---|---|---|
| 0x0000 | 0 | DES HMAC-SHA1 |
| 0x1000 | 1 | DES HMAC-SHA1 |
| 0x2000 | 2 | DES HMAC-MD5 |
| 0x3000 | 3 | |
| 0x4000 | 4 | DES HMAC-MD5 |
| 0x5000 | 5 | DES HMAC-SHA1 |
| 0x6000 | 6 | DES HMAC-MD5 |
| 0x7000 | 7 | DES HMAC-SHA1 |

S101

S103

S104

S106

S107

S109

S110

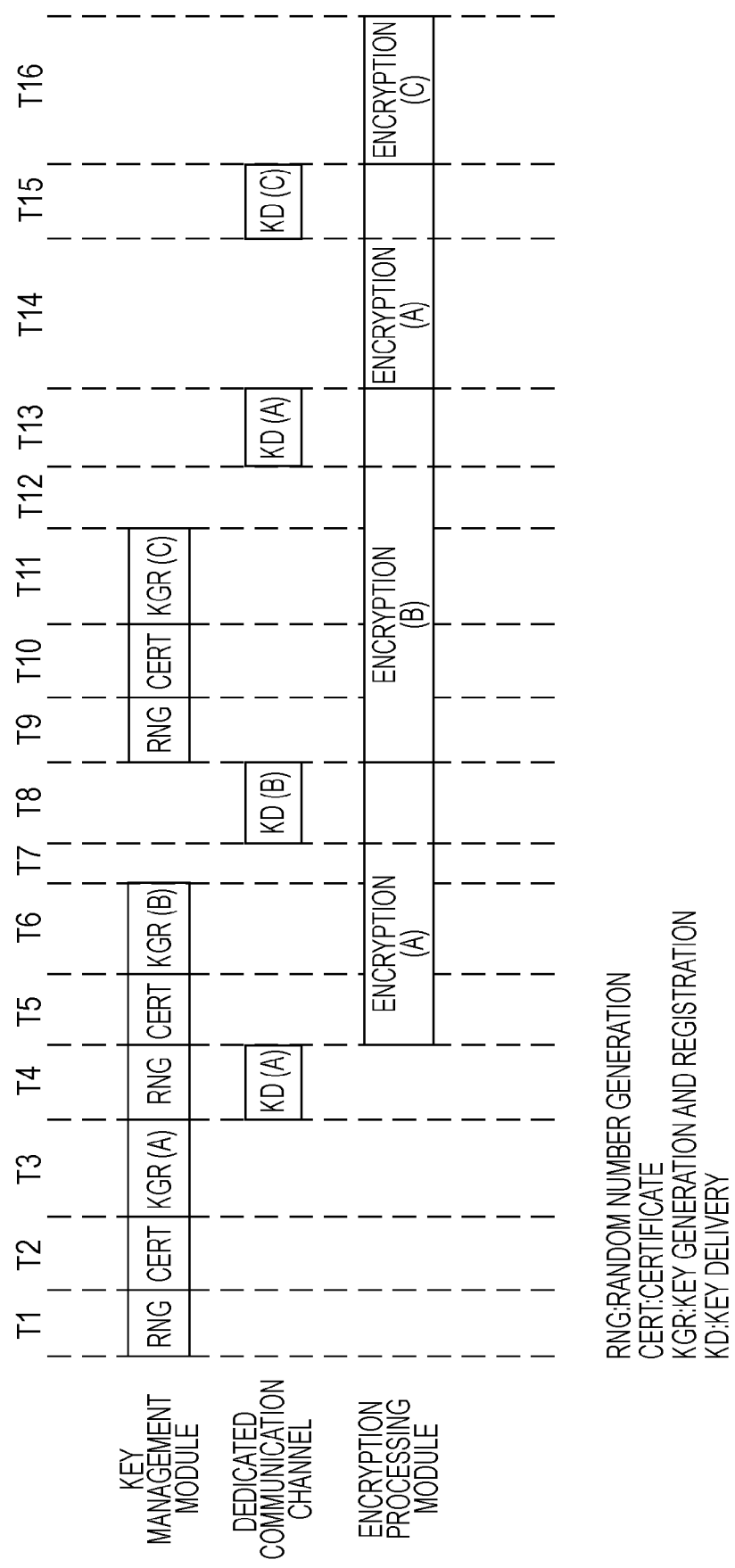

S114' | COMPLETE KEY DELIVERY (HASH) | ENTRY NUMBER | HASH VALUE (KEY) |

FIG. 12K

S115' | COMPLETE KEY DELIVERY (HASH) | ENTRY NUMBER | HASH VALUE (KEY) |

FIG. 12L

S116 | REQUEST ENCRYPTION PROCESS | ENTRY NUMBER | READ ADDRESS (2 Bytes) | READ DATA LENGTH (2 Bytes) | WRITTEN ADDRESS (2 Bytes) | WRITTEN DATA LENGTH (2 Bytes) |

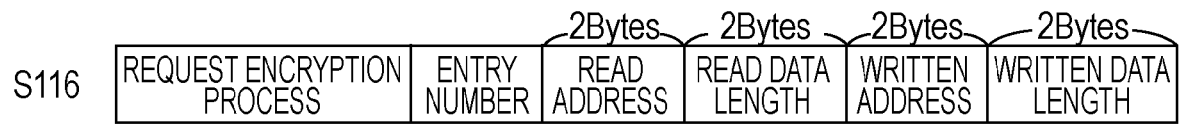

FIG. 12M

S118 | COMPLETE ENCRYPTION PROCESS | ENTRY NUMBER |

FIG. 12N

S119 | REQUEST KEY DISPOSAL | ENTRY NUMBER |

FIG. 12O

S121 | COMPLETE KEY DISPOSAL | ENTRY NUMBER |

FIG. 12P

S401 | REQUEST HELD KEY CONFIRMATION (1 Byte) | ENTRY NUMBER (1 Byte) |

FIG. 12Q

S402 | COMPLETE HELD KEY CONFIRMATION | INSPECTION RESULT (1 Byte) |

COMMUNICATION ENCRYPTION PROCESSING APPARATUS

BACKGROUND OF THE INVENTION

1. Field of the Invention

The present invention relates to a communication encryption processing apparatus for performing an encryption process, an authentication process, and the like.

2. Description of the Related Art

In recent years, various types of data such as documents, images, and audio have been transmitted and received across the globe via communication paths including the Internet, an intranet, etc. At the same time, demands for faster communication have been increased along with the spread of ADSL, optical fibers, and so on. A large number of pieces of data desired to be kept secret to third parties are contained among the transmitted and received data, such as data related to an individual's privacy and classified data. For that reason, communication encryption processing technologies have been developed for performing a communication through encrypting data by way of SSL/TLS, IPsec, etc., so that the data becomes unbreakable to third parties.

Here, a brief description will be given of SSL/TLS as an example of the communication encryption processing technologies. Main protocols of SSL/TLS are a handshake protocol and a record protocol. Based on the handshake protocol, authentication of a communicating partner, selection of an encryption algorithm used for the record protocol, and generation of a common key used for the encryption algorithm are performed.

On the other hand, based on the record protocol, calculation for a message authentication code of the transmitted and received data, and encryption and decryption are performed. Thus, SSL/TLS prevents impersonation by performing the authentication of the communicating partner, data tamper by calculating MD of the transmitted and received data, and eavesdropping by encrypting the transmitted and received data.

FIG. 11 illustrates an example of a conventional security chip 900 that performs SSL/TLS.

In the conventional security chip 900, a main CPU 10 performs a control within the conventional security chip 900. Then, a communication I/F 11 transmits and receives data via a network 102 with an external apparatus A 12, an external apparatus B 13, the external apparatus C 14, etc., so that a communication encryption processing apparatus 901 performs a process of SSL/TLS.

The main CPU 10, the communication I/F 11, and the communication encryption processing apparatus 901 are connected to one another via a common bus 101. The communication encryption processing apparatus 901 includes a CPU 2, which stores a control program for performing an entire control within the communication encryption processing apparatus 901 and a work memory 3 for temporarily holding data before and after a process is performed in an encryption and decryption processing module 906.

The communication encryption processing apparatus 901 also includes an external I/F 4 for writing the data received from the main CPU 10 and the communication I/F 11 in the work memory 3 and transmitting the data from the work memory 3 to the main CPU 10 and the communication I/F 11. The communication encryption processing apparatus 901 also includes a key management module 905 for managing a life cycle of a key used for the encryption and decryption process in the communication encryption processing apparatus 901.

The communication encryption processing apparatus 901 also includes the encryption and decryption processing module 906 used for performing the encryption process and the decryption process with respect to the data read from the work memory 3 by using the key supplied from the key management module 905 and for generating the message authentication code. The communication encryption processing apparatus 901 also includes a memory 908, which is connected to the key management module 905 via memory bus 912, that is used in the encryption and decryption processing module 906, for storing the key whose life cycle is managed by the key management module 905. The CPU 2, the work memory 3, the external I/F 4, the key management module 905, and the encryption and decryption processing module 906 are connected one another via a common bus 100.

Next, an operation of the conventional security chip 900 will be briefly described.

When the main CPU 10 receives data from the external apparatus A 12 via the network 102 and the communication I/F 11, the main CPU 10 transmits the received data to the communication encryption processing apparatus 901. Next, the communication encryption processing apparatus 901, which has received the data via the external I/F 4, temporarily holds the received data in the work memory 3.

Next, the communication encryption processing apparatus 901 delivers the key shared with the external apparatus A 12 from the key management module 905 to the encryption and decryption processing module 906. Next, the encryption and decryption processing module 906 reads the data held in the work memory 3 to perform the encryption and decryption process and writes the processed data in the work memory 3 again. Finally, when the processes on all the data received by the encryption and decryption processing module 906 are completed, the data held in the work memory 3 is sent to the main CPU 10 via the external I/F 4.

FIG. 10 illustrates timings for the key generation and key delivery process performed in the key management module 905 while an encryption communication is performed in the following three partners including the external apparatus A 12, the external apparatus B 13, and the external apparatus C 14 and timings for the encryption process performed in the encryption and decryption processing module 906.

First, at T101, a key used for the encryption communication with the external apparatus A 12 is generated. At T102, the key generated at T101 is delivered from the key management module 905 to the encryption processing module. From T103 to T105, the encryption and decryption processing module 906 performs the encryption process. At this time, the key management module 905 generates a key necessary for the encryption communication with the external apparatus B 13 at T104.

When the encryption process is completed, at T106 the key management module 905 delivers the key generated at T104 which is necessary for the encryption communication with the external apparatus B 13. Subsequently, at T107, the encryption and decryption processing module 906 uses the key delivered at T106 to perform the encryption process for the encryption communication with the external apparatus B 13.

In order that the encryption communication is performed with the external apparatus A 12 again at T108, the key management module 905 generates a key at T101. After that, the held key used for the external apparatus A 12 is delivered to the encryption and decryption processing module 906, at T109 and T110, the encryption and decryption processing module 906 performs the encryption process for the encryption communication with the external apparatus A 12.

At T110, the key management module 905 generates a key for the encryption communication with the external apparatus C 14. At T111, the key is delivered to the encryption and decryption processing module 906. Then, at T112, the encryption and decryption processing module 906 performs the encryption process for the encryption communication with the external apparatus C 14.

In this manner, the communication encryption processing apparatus can perform the encryption communication with the three partners of the external apparatus A 12, the external apparatus B 13, and the external apparatus C 14 (refer to Japanese Patent Laid-Open No. 2006-191207).

However, in the above-described conventional example, it is necessary to deliver the key used for the encryption process from the key management module via the bus. For this reason, the key itself is obvious from the control program on the CPU that controls the entirety of the system. Thus, there is a security risk problem in that the key is leaked to the outside if the control program is accidentally infected by a virus or the like. Also, as the input and output data is transmitted and received between the encryption and decryption processing module and the memory, there is a problem in that if the bus is used for the key delivery, the transfer efficiency is decreased and the efficient delivery cannot be preformed.

SUMMARY OF THE INVENTION

The present invention has been made in view of the above to enable a desired process without dealing with raw key data on a bus by providing a dedicated communication channel between a key management module and an encryption and decryption process and delivering a key and obtaining a hash value of key data through the dedicated communication channel.

According to an aspect of the present invention, there is provided a communication encryption processing apparatus that includes an interface configured to perform input and output of data, a first storage unit configured to store the data, an encryption and decryption processing module configured to read the data stored in the interface or the first storage unit to perform an encryption or decryption process or generate a message authentication code, wherein a result of the encryption, decryption, or message authentication code is stored in the first storage unit, a key management module configured to generate and provide a key to the encryption and decryption processing module, a second storage unit configured to store non-public information, and a third storage unit configured to store information associated with the key provided to the encryption and decryption processing module, where a dedicated signal line is provided between the key management module and the encryption and decryption processing module, and where the key is provided to the encryption and decryption processing module via the dedicate signal line.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 illustrates an example of session information managed by a control program on a CPU according to the first embodiment of the present invention.

FIG. 3 illustrates an example of information managed by a key management module according to the first embodiment of the present invention.

FIG. 8 illustrates detailed timings at which the communication encryption processing apparatus performs an encryption communication with plural partners according to the first embodiment of the present invention.

DESCRIPTION OF THE EMBODIMENTS

Exemplary embodiments of the present invention will now be described in detail in accordance with the accompanying drawings.

Figure 1:
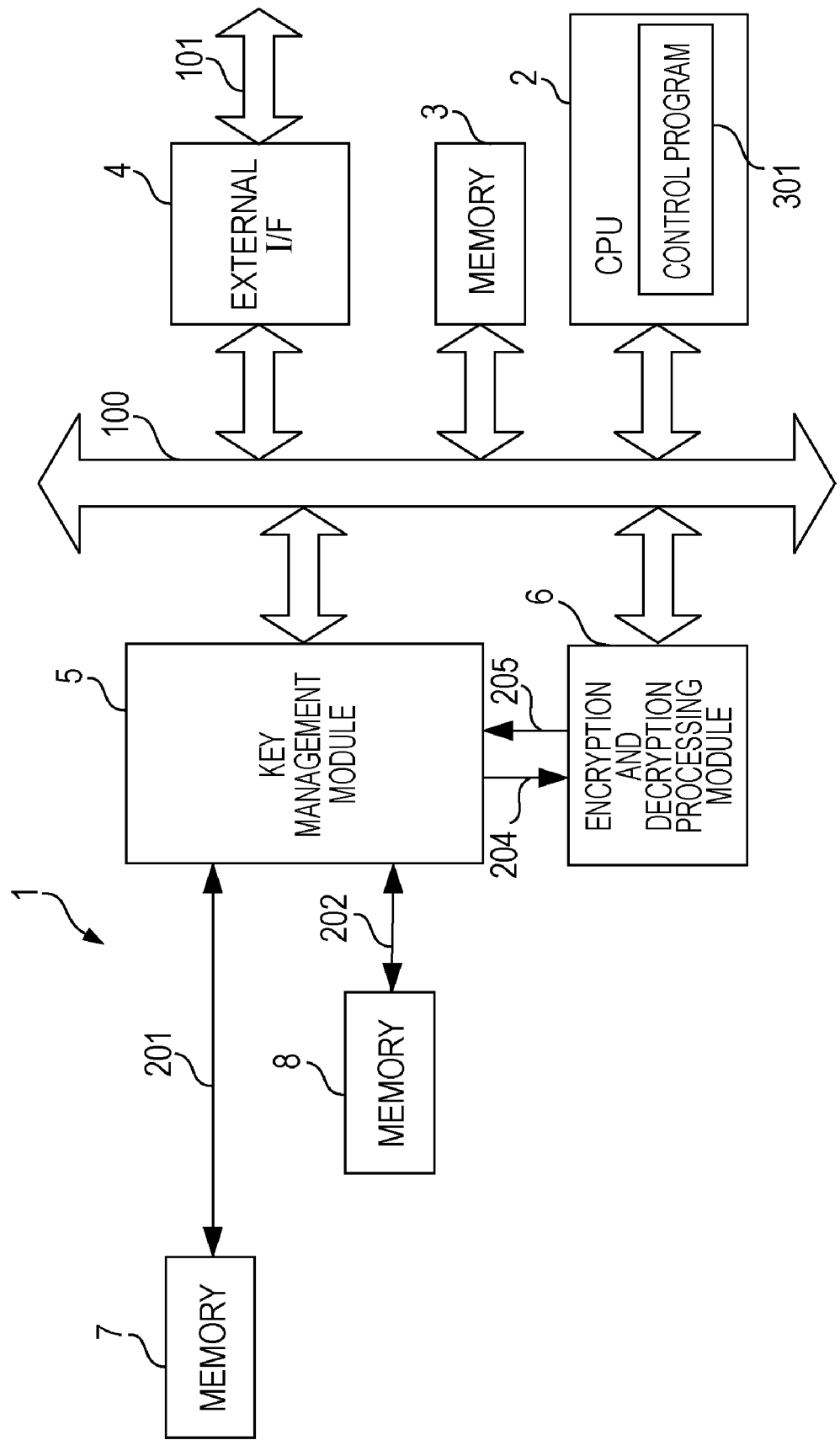
FIG. 1 illustrates a block configuration of a communication encryption processing apparatus which embodies an aspect of the present invention.

FIG. 1 illustrates an internal configuration of a communication encryption processing apparatus according to a first exemplary embodiment of the present invention.

In FIG. 1, a communication encryption processing apparatus 1 is adapted to perform a communication encryption processing SSL/TLS. A CPU 2 includes a control program 301 for controlling the communication encryption processing apparatus 1. More specifically, the control program 301 controls the key management module 5 and the encryption and decryption processing module 6 and also specifying keys held in the memory 7 and the memory 8. A work memory 3 is adapted to temporarily hold data before or after being processed by an encryption and decryption processing module 6.

An external interface 4 is used for inputting data into the work memory 3 from outside the communication encryption processing apparatus 1 or for outputting data from the work memory 3 to the outside. A key management module 5 is adapted to manage a life cycle of a key used in an encryption and decryption process by the communication encryption processing apparatus 1. An encryption and decryption processing module 6 is adapted to perform an encryption process or a decryption process with respect to the data read from the work memory 3 by using the key supplied from the key management module 5 or to generate a message authentication code.

A first memory 7 is adapted to hold an X.509 certificate used for mutual authentication in the communication encryption processing SSL/TLS. While the present embodiment describes an X.509 certificate, any other security certificate that would enable practice of the present invention is applicable. A second memory 8 is used in the record protocol of SSL/TLS by the encryption and decryption processing module 6, and is adapted to hold the key whose life cycle is managed by the key management module 5. A bus 100 connects the CPU 2, the work memory 3, the external interface 4, the key management module 5, the encryption and decryption processing module 6, etc., to one another.

A bus 101 connects the external interface 4 with an external apparatus. Dedicated signal lines 204 and 205 connect between the key management module 5 and the encryption and decryption processing module 6.

FIG. 2 illustrates an example of session information managed by the control program 301.

An identifier is a numeral value for identifying a session used for an encryption process. In the case of SSL/TLS, the identifier is a session ID for identifying an encryption communication path. The session ID is determined by the handshake protocol of SSL/TLS described above.

An entry number is a number allocated by the control program 301 to the identifier on one-on-one basis. The entry number is used for identifying the key in the communication among the control program 301, the key management module 5, and the encryption and decryption processing module 6. In this example, up to eight keys are dealt with, and therefore values 0 to 7 are allocated to the entry numbers.

An activation flag is a flag indicating a status of the key that is identified with the entry number. The following four statuses are indicated: an initialized status in which the key identified with the entry number is not held in the second memory; a registering status during which the control program 301 transmits a key generation and registration request identified with the entry number to the key management module 5 and then a key generation and registration request completion is received from the key management module 5; a registered status in which the key identified with the entry number is registered in the second memory; and a disposing status during which the control program 301 transmits a key disposal request to the key management module 5 and then a key disposal completion is received from the key management module 5.

The control program 301 is able to find out the status of the respective keys by checking the activation flag. First, in the initialized status, the activation flag is set as the initialized status. When the control program 301 transmits the key generation and registration request, the activation flag of the corresponding entry number indicates the registering status. Next, when the control program 301 receives a key generation and registration completion signal, the activation flag indicates the registered status. After the key use is completed, and when the control program 301 transmits the key disposal request, the activation flag indicates the disposing status. When a key disposal completion signal is received, the activation flag indicates the initialized status.

A cipher suite is an encryption processing algorithm used in the encryption and decryption processing module 6. In this case, the cipher suite is an encryption processing algorithm used in the record protocol of SSL/TLS.

FIG. 3 illustrates an example of information managed by the key management module 5.

The entry number is a number for identifying the key and is identical to the entry number managed by the control program 301. A memory address indicates an address at which the key corresponding to the respective entry numbers is held in the second memory 8. The cipher suite is the same as the cipher suite managed by the control program 301 and is an encryption processing algorithm used in the encryption and decryption processing module 6.

Figure 4:
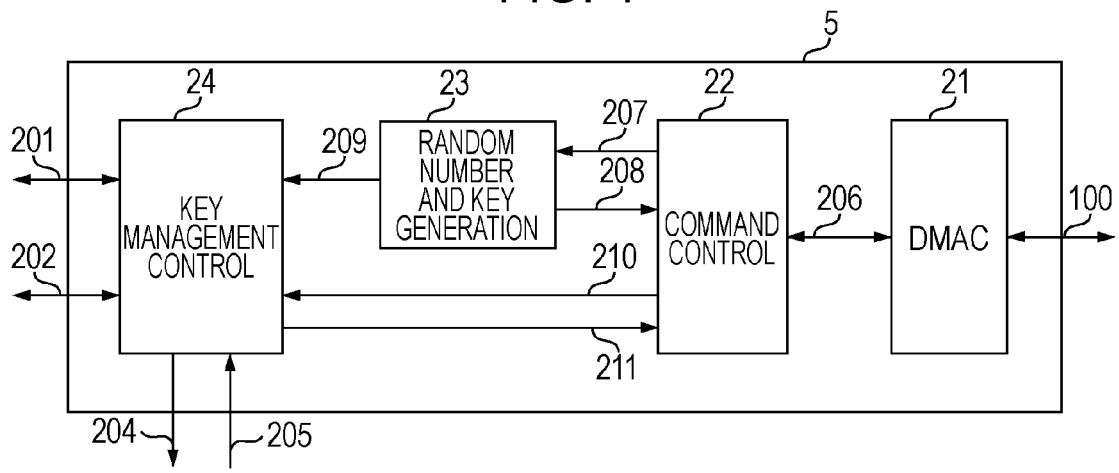
FIG. 4 illustrates an internal configuration of the key management module according to the first embodiment of the present invention.

FIG. 4 illustrates an internal configuration of the key management module 5.

In FIG. 4, a DMA controller 21 is adapted to perform data transmission and reception via the bus 100. Reference numeral 22 denotes a command control unit, reference numeral 23 denotes a random number and key generation unit, and reference numeral 24 denotes a key management control unit. A signal line 206 connects between the DMA controller 21 and the command control unit 22. Signal lines 207 and 208 connect between the command control unit 22 and the key generation unit 23. Reference numeral 209 denotes a signal line from the key generation unit to the key management control unit. Signal lines 210 and 211 connect between the command control unit and the key management control unit.

Figure 5:
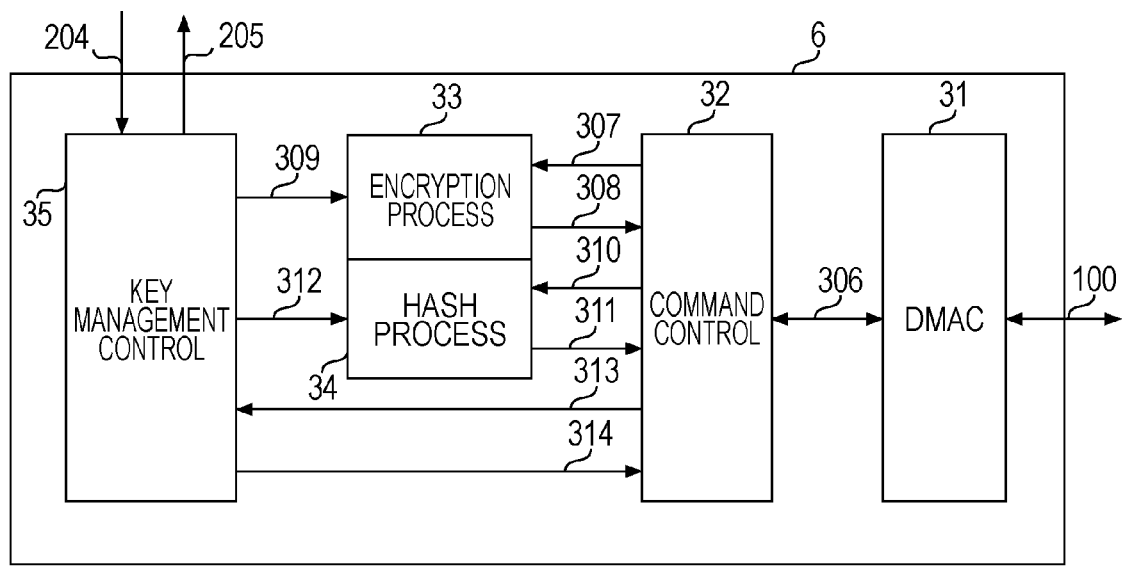
FIG. 5 illustrates an internal configuration of an encryption and decryption processing module according to the first embodiment of the present invention.

FIG. 5 illustrates an internal configuration of the encryption and decryption processing module 6.

In FIG. 5, a DMA controller 31 is adapted to perform data transmission and reception via the bus 100. Reference numeral 32 denotes a command control unit, reference numeral 33 denotes an encryption processing unit, and reference numeral 34 denotes a hash processing unit. A signal line 306 connects between the DMA controller 31 and the command control unit 32. Signal lines 307 and 308 connect between the command control unit 32 and the encryption processing unit 33. Reference numeral 309 denotes a signal line from a key management control unit 35 to the encryption processing unit 33. Signal lines 310 and 311 connect between the command control unit and the hash processing unit. Reference numeral 312 denotes a signal line from the key management control unit 35 to a hash processing unit 34.

Figure 6:
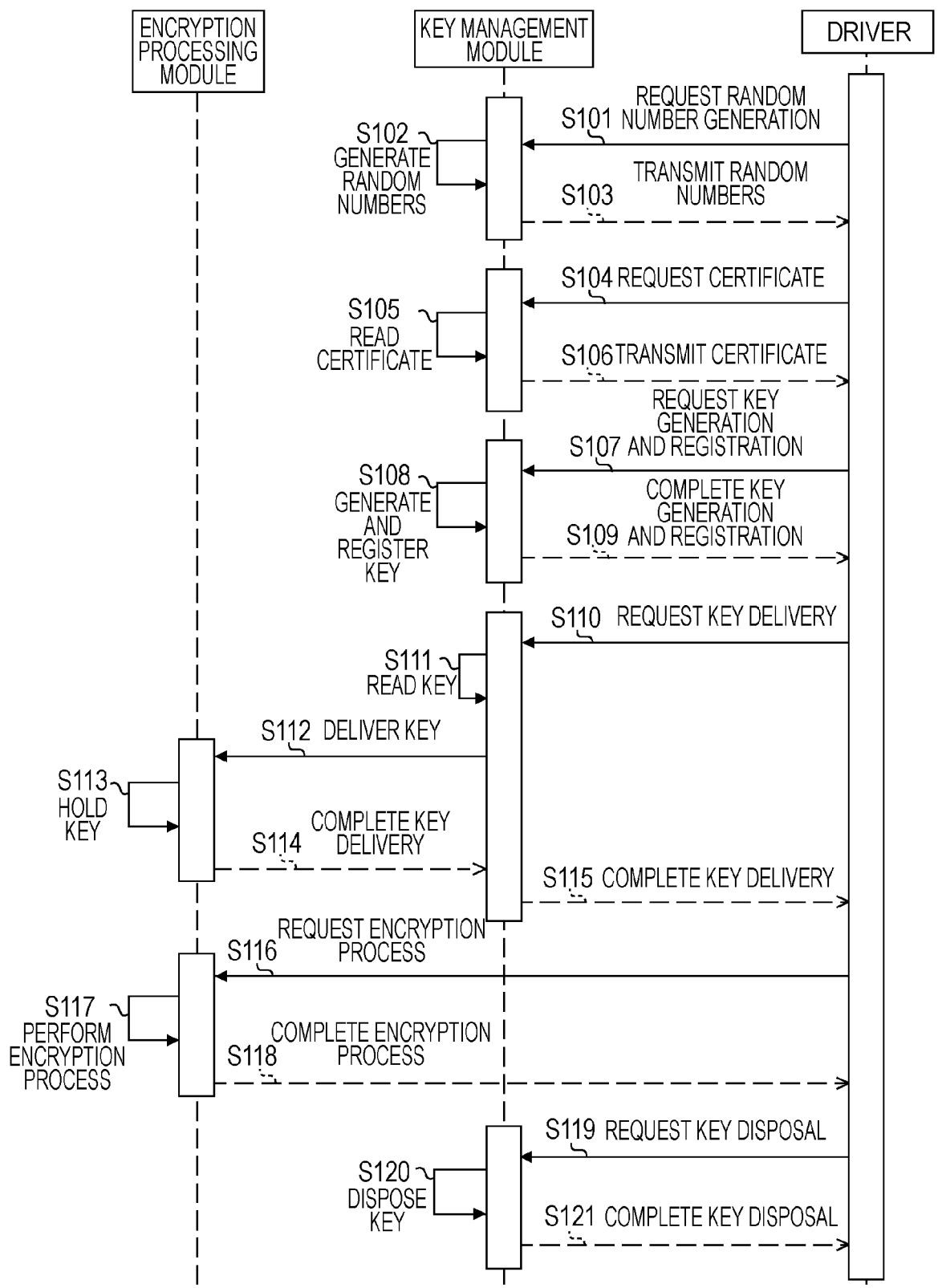
FIG. 6 illustrates a sequence of data transmission and reception among the control program on the CPU, the key management module, and the encryption and decryption processing module according to the first embodiment of the present invention.

FIG. 6 illustrates a sequence diagram illustrating the data transmission and reception performed among the control program 301, the key management module 5, and the encryption and decryption processing module 6 from the beginning of communication until the end of communication of SSL/TLS performed in the communication encryption processing apparatus 1.

Figure 7A:
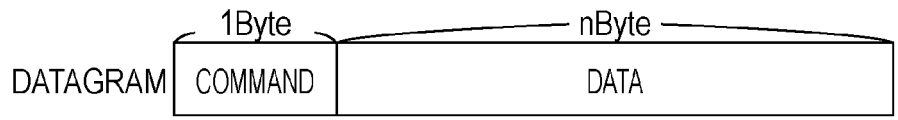
FIGS. 7A to 7O illustrate datagrams transmitted and received among the control program on the CPU, the key management module, and the encryption and decryption processing module according to the first embodiment of the present invention.
Figure 7B:
Figure 7C:
Figure 7D:
Figure 7E:
Figure 7F:
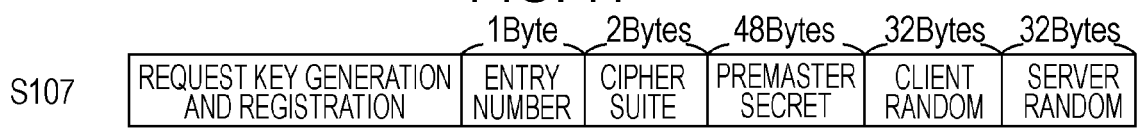
Figure 7G:
Figure 7H:
Figure 7I:
Figure 7J:
Figure 7K:
Figure 7L:
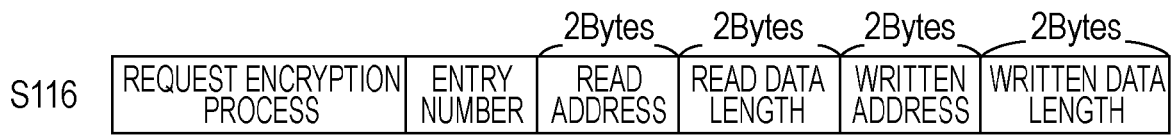
Figure 7M:
Figure 7N:
Figure 7O:
Figure 9:
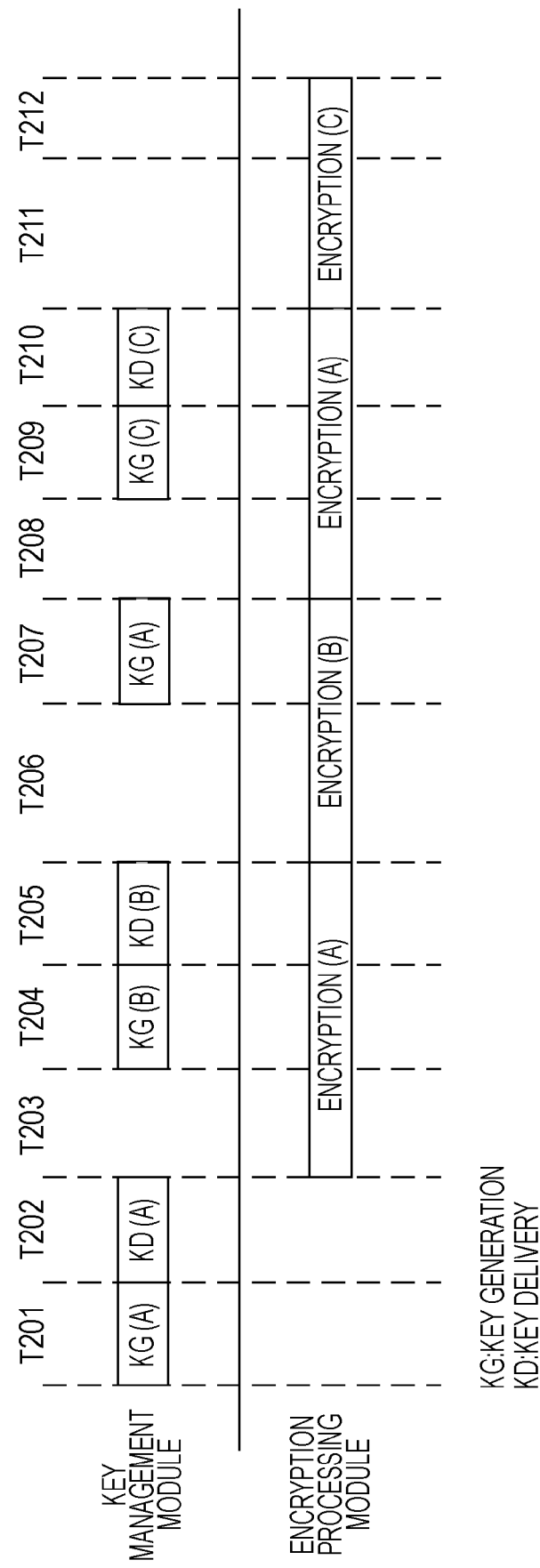
FIG. 9 illustrates an overview of timings at which the communication encryption processing apparatus performs an encryption communication with plural partners according to the first embodiment of the present invention.
Figure 10:
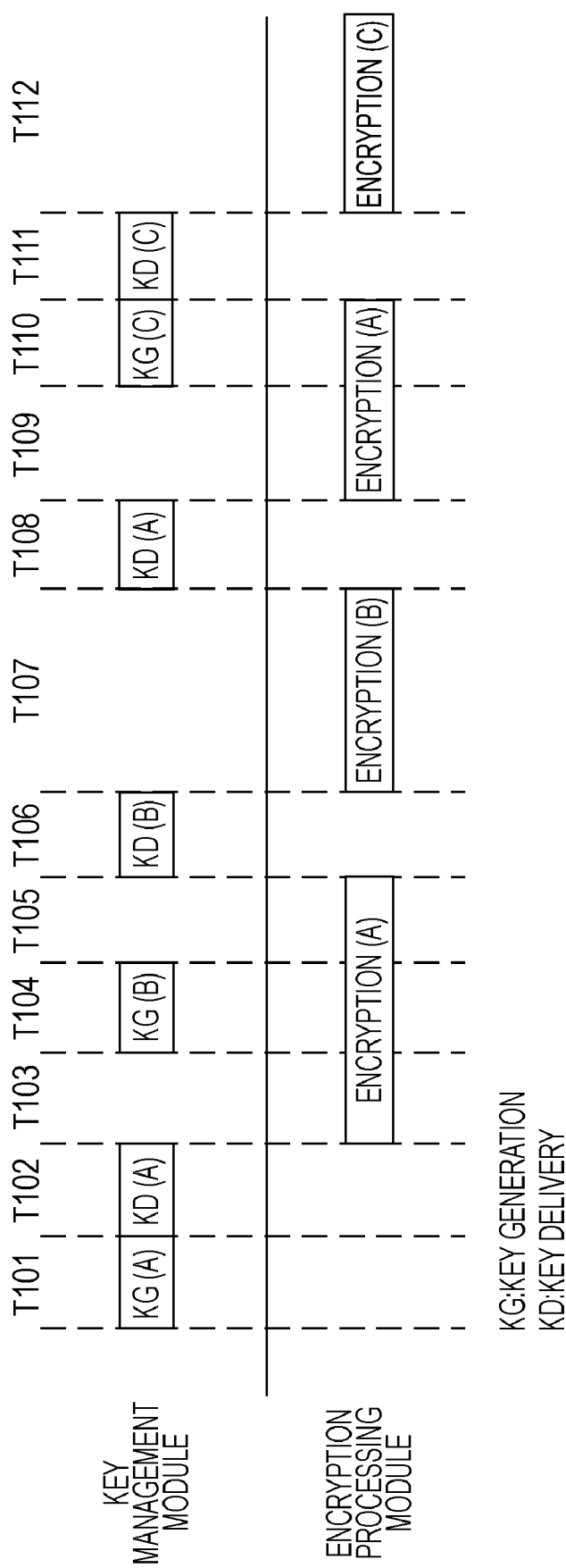
FIG. 10 illustrates an overview of timings at which a communication encryption processing apparatus in a conventional technology performs an encryption communication with plural partners the encryption communication.
Figure 11:
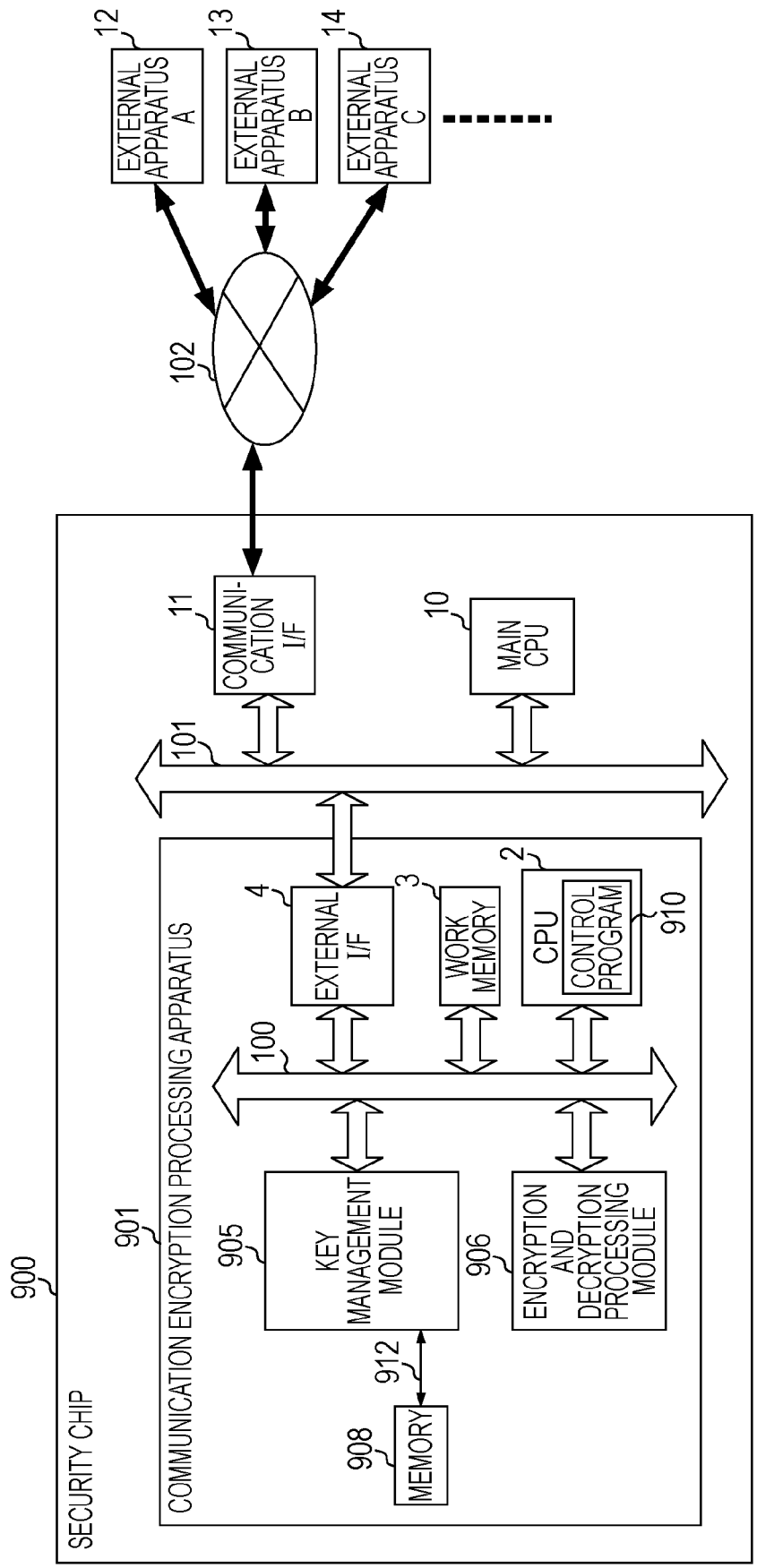
FIG. 11 is a schematic diagram illustrating an internal configuration of the conventional communication encryption processing apparatus and a communicating partner.

FIGS. 7A to 7O illustrate formats of datagrams transmitted and received among the control program 301, the key management module 5, and the encryption and decryption processing module 6. FIG. 7A illustrates a configuration of this datagram. The datagram is composed of a one byte command and data having a bit length determined by each command.

Next, with reference to FIGS. 6 and 7A to 7O, a description will be given of a data transmission and reception sequence of the present embodiment.

In Step S101, the control program 301 transmits a random number generation request to the key management module 5. A format of a datagram representing the random number generation request is illustrated in FIG. 7B, and the command unit is composed of a one byte code representing the random number generation request connected with a code representing a random number length.

Next, in Step S102, the key management module 5 generates random numbers. The key management module 5 has the configuration illustrated in FIG. 6 as described above. The random number generation request datagram received through the DMA controller 21 in Step S101 is sent to the command control unit 22. The command control unit 22 analyzes the received data to send the random number generation request datagram to the random number and key generation unit 23 via the signal line 207. The random number and key generation unit 23 takes out a bit length of the random numbers from the received datagram to generate random numbers having a desired bit length. Then, the generated random numbers are sent to the command control unit via the signal line 208.

In Step S103, as illustrated in FIG. 7C, the command control unit 22 in the key management module 5 outputs a datagram in which a command representing completion of the random number generation is connected with the thus generated random numbers via the DMA controller 21 to the bus 100. Then, the control program 301 receives this datagram. It is noted that a method of using the generated random numbers is as described in the written standards of SSL/TLS.

In Step S104, the control program 301 transmits a certificate request to the key management module 5. A format of a certificate request datagram is, as illustrated in FIG. 7D, composed of a command representing the certificate request connected with data representing an identifier.

In Step S105, inside the key management module 5, the certificate request datagram is sent to the command control unit 22 via the DMA controller 21 illustrated in FIG. 6. The command control unit 22 sends the certificate request datagram to the key management control unit 24 via the signal line 210. The key management control unit 24 reads the certificate from the non-volatile memory 7 via a memory bus 201 and sends the certificate to the command control unit 22 via the signal line 211.

In Step S106, the command control unit 22 generates a datagram illustrated in FIG. 7E in which a command representing transmission of the certification is connected with the certification read from the non-volatile memory 7. Then the DMA controller 21 transmits the datagram to the control program 301 via the bus 100.

In Step S107, the control program 301 transmits the key generation and registration request to the key management module 5. The control program 301 holds the session information illustrated in FIG. 2. The session ID obtained in the handshake protocol of SSL/TLS is set as an identifier and the entry number in which the activation flag of the session information is in the initialized status is extracted and connected. Also, similarly, a code indicating a particular cipher suite used for the communication determined in the handshake protocol is held in the session information.

It is noted that at this time, the control program 301 can generate not more than the number of key generation requests determined by the control program specification, and therefore the entry number in which the activation flag is in the initialized status is necessarily present. Then, the activation flag of the entry number where the key generation request is made is rewritten to the registering status.

The control program 301 generates a key generation and registration request datagram from the information on a key management table (FIG. 3) determined in this manner and transmits the key generation and registration request datagram to the key management module 5. It is noted that the key generation and registration request datagram is, as illustrated in FIG. 7F, composed of a command representing the key generation and registration request, the entry number, the cipher suite, a premaster secret, a client random, and a server random. The key management module 5 receives the key generation and registration request and sends the key generation and registration request to the command control unit 22.

In Step S108, in the key management module 5, the command control unit 22 sends the key generation and registration request datagram to the random number and key generation unit 23 via the signal line 207. The random number and key generation unit 23 follows the method described in the standards of SSL/TLS to perform the key generation. As illustrated in FIG. 7G, the random number and key generation unit 23 generates a datagram in which the key generation and registration completion signal is connected with the entry number and sends the datagram to the key management control unit 24 via the signal line 209. The key management control unit 24 holds the key management table illustrated in FIG. 3 and manages the entry number and the cipher suite sent from the random number and key generation unit being associated with a predetermined address on the memory 8. Then, the sent key is written from the address on the memory 8 corresponding to the entry number via a memory bus 202.

In Step S109, as illustrated in FIG. 7G, in the key management module 5, the key management control unit 24 generates a datagram in which a command representing completion of the key generation and registration is connected with the entry number and sends the datagram to the command control unit 22. The command control unit 22 sends this datagram via the signal line 206, the DMA controller 21, and the bus 100 to the control program 301. The control program 301 manages a timing for the key delivery from the key management module 5 to the encryption and decryption processing module 6.

In Step S110, as illustrated in FIG. 7H, at a desired timing, a datagram in which a command representing a key delivery request is connected with the entry number of the delivered key and transmitted to the key management module 5. Then, in the key management module 5, the command control unit 22 receives this datagram via the bus 100, the DMA controller 21, and the signal line 206.

In Step S111, the command control unit 22 sends this datagram via the signal line 210 to the key management control unit 24. The key management control unit 24 identifies an address on the memory 8 represented by the entry number received from the held key management table in FIG. 3, and reads the desired key data via the memory bus 202.

In Step S112, the key management control unit 24 in the key management module 5 generates a datagram illustrated in FIG. 7I and sends the datagram to the dedicated signal line 204. At this time, the key management control unit 24 generates key data from the received datagram, the cipher suite identified by the entry number in the received datagram from the key management table in FIG. 3, which is held by the key management control unit 24, and the key data read in Step S111.

In Step S113, via the dedicated signal line 204, the encryption and decryption processing module 6 receives the datagram illustrated in FIG. 7I from the key management module 5 and holds the datagram in the key management control unit 35.

In Step S114, as illustrated in FIG. 7J, the encryption and decryption processing module 6 generates a datagram composed of a command representing completion of the key delivery and the key number the key management control unit 35. Then, via the dedicated signal line 205, the datagram is transmitted to the key management module 5 and the key management control unit 24 receives this datagram.

In Step S115, the key management control unit 24 generates a datagram composed of in a command representing completion of the key delivery and the entry number illustrated in FIG. 7K and sends the datagram to the command control unit 22. Then, via the signal line 206, the DMA controller 21, the bus 100, the datagram is transmitted to the control program 301.

The control program 301 controls a timing at which the encryption process is performed. In Step S116, after the key delivery completion signal is received in Step S115, a datagram is generated and, at a desired timing, transmitted to the encryption and decryption processing module 6. As illustrated in FIG. 7L, this datagram includes a command representing an encryption process request, the entry number, a top address of the processed data stored on the work memory 3, and a length of the processed data. Furthermore, this datagram includes a top address on the work memory 3 to which data after the encryption process is written and a length of the data after the encryption process.

In Step S117, in the encryption and decryption processing module 6, the DMA controller 31 receives this datagram via the bus 100 to hold and send this datagram to the command control unit 32. Also, from this datagram, the address where the processed data is stored on the work memory 3 and the data length are extracted. Then predetermined processed data is read from the work memory 3 and sent to the command control unit 32.

Next, the command control unit 32 sends the encryption process request command and the entry number to the key management control unit 35 via the signal line 314. The key management control unit 35 then sends the entry number and the corresponding key used for the encryption to the encryption processing unit 33 via the signal line 309. The key for a keyed hash process corresponding to the entry number is sent via the signal line 312 to the hash processing unit 34.

Also, the command control unit 32 first sends the processed data via the signal line 311 to the hash processing unit 34, and the computation result is received via a signal line 313. Furthermore, the command control unit 32 sends data obtained by adding the computation result in the hash processing unit 34 to the processed data via the signal line 307 to the block encryption processing unit 33. Then, the thus obtained computation result is received via the signal line 310. The command control unit 32 sends the thus obtained encrypted data via the signal line 306 to the DMA controller 31. Then, the DMA controller 31 writes the encrypted data of a predetermined length on the work memory 3 indicated in the received datagram from the control program 301.

In Step S118, as illustrated in FIG. 7M, in the encryption and decryption processing module 6, the command control unit 32 generates a datagram composed of a command representing completion of the encryption process and the entry number and sends the datagram to the control program 301.

The control program 301 manages a timing at which the key is disposed. In Step S119, after completion of the encryption communication, when the key is no longer necessary, the control program 301 generates a datagram composed of a command representing the key disposal request and the entry number illustrated in FIG. 7N in the key management module 5 and sends the datagram to the key management module 5. The key management module 5 receives this datagram and sends the datagram to the command control unit 32 via the DMA controller 31, the signal line 306.

In Step S120, in the key management module 5, the command control unit 32 sends the key disposal request datagram to the key management control unit 35 via the signal line 313. The key management control unit 35 takes out the entry number from the received datagram and refers to the key management table illustrated in FIG. 3 to initialize the key data hold at the corresponding address on the memory 8.

In Step S121, the key management control management unit 35 in the key management module 5 generates a datagram composed of a command representing completion of the key disposal and the entry number illustrated in FIG. 7O and sends the datagram to the command control unit 32 via a signal line 314. The command control unit 32 transmits the key disposal completion datagram to the control program 301 via the signal line 306, the DMA controller 31, and the bus 100.

In the above, a description has been provided of the series of sequences in which the communication encryption processing apparatus 1 performs the encryption communication according to the present embodiment of the present invention. Now a case of performing the encryption communication with a plurality of communication partners will be described using the timing chart of FIG. 8.

In FIG. 8, the encryption communication is performed with three partners A, B, and C. First, the above-described series of sequences are performed in which the random number generation at T1, the certificate transmission at T2, and the key generation and registration at T3 are conducted.

At T4, the key generated and registered at T3 is delivered from the key management module 5 to the encryption and decryption processing module 6 with use of dedicated lines 204 and 205. Also, in parallel, in order to perform the encryption communication with the partner B, the random number generation request is received from the control program 301 via the bus 100 and the random number generation is performed.

At T5, the key management module 5 sends the certificate addressed to the partner B and at the same time the encryption and decryption processing module 6 performs the encryption on data to be communicated with A. At T6, while the key management module 5 performs the key generation and registration in order to conduct the encryption communication with the partner B, at the same time, the encryption and decryption processing module 6 continues performing the encryption process until T7.

At T8, as the encryption and decryption processing module 6 completes the encryption process on the data to be transmitted to the partner A, the key management module 5 delivers the key for performing the encryption communication with the already registered partner B. Then the encryption and decryption processing module 6 changes the key for the partner A to the key for the partner B which is used for the encryption process.

From T9 to T11, the key management module 5 performs the random number generation, the certificate transmission, and the key generation and registration for the encryption communication with the partner C. The encryption and decryption processing module 6 performs the encryption process for the encryption communication with the partner B from T9 to T12.

At T13, as the encryption and decryption processing module 6 completes the encryption process on the data to be transmitted to the partner B, the key management module 5 delivers the key for performing the encryption communication with the already registered partner A. The encryption and decryption processing module 6 again changes the key for the partner B to the key for the partner A which is used for the encryption process.

At T14, the encryption and decryption processing module 6 performs the encryption process for the encryption communication with the partner A. At T15, as the encryption and decryption processing module 6 completes the encryption process on the data to be transmitted to the partner A, the key management module 5 delivers the key for performing the encryption communication with the already registered partner C. Then, the encryption and decryption processing module 6 changes the key for the partner A to the key for the partner C which is used for the encryption process. At T16, the encryption and decryption processing module 6 performs the encryption process for the encryption communication with the partner C.

Hereinafter, with the similar procedure, for the encryption communication with the plural partners, it is possible to perform a process for preparing the encryption communication and the encryption process in parallel. As has been described above, in the communication encryption processing apparatus, by connecting between the key management module connected to one bus and the encryption and decryption processing module with the dedicated signal line and delivering the key used for the encryption process with use of the dedicated signal line, it is possible to efficiently perform the encryption communication with plural partners. In addition, by delivering the key used for the encryption process, on dedicated signal line which is hidden from the control program on the CPU, it is possible to improve the tamper resistance.

Figure 12A:
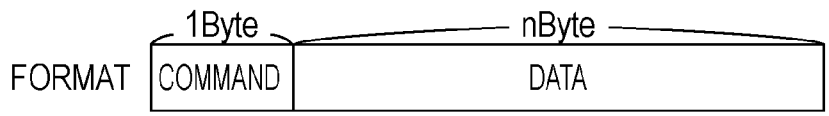
FIGS. 12A to 12Q illustrate datagrams transmitted and received among the control program on the CPU, the key management module, and the encryption and decryption processing module according to a second embodiment of the present invention.
Figure 12B:
Figure 12C:
Figure 12D:
Figure 12E:
Figure 12F:
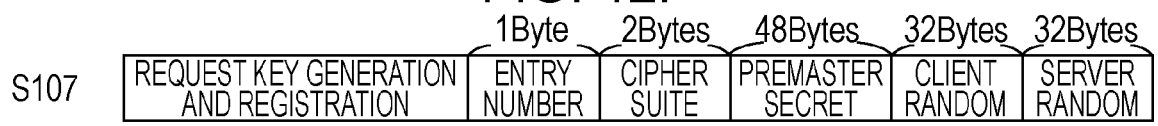
Figure 12G:

FIGS. 12A to 12Q illustrate datagrams transmitted and received among the control program 301 on the CPU 2, the key management module 5, and the encryption and decryption processing module 6 according to a second embodiment of the present invention. FIGS. 12A to 12Q are similar to FIGS. 7A to 7O, with the exception of FIGS. 12H, 12I, 12J, and 12K.

Figure 13:
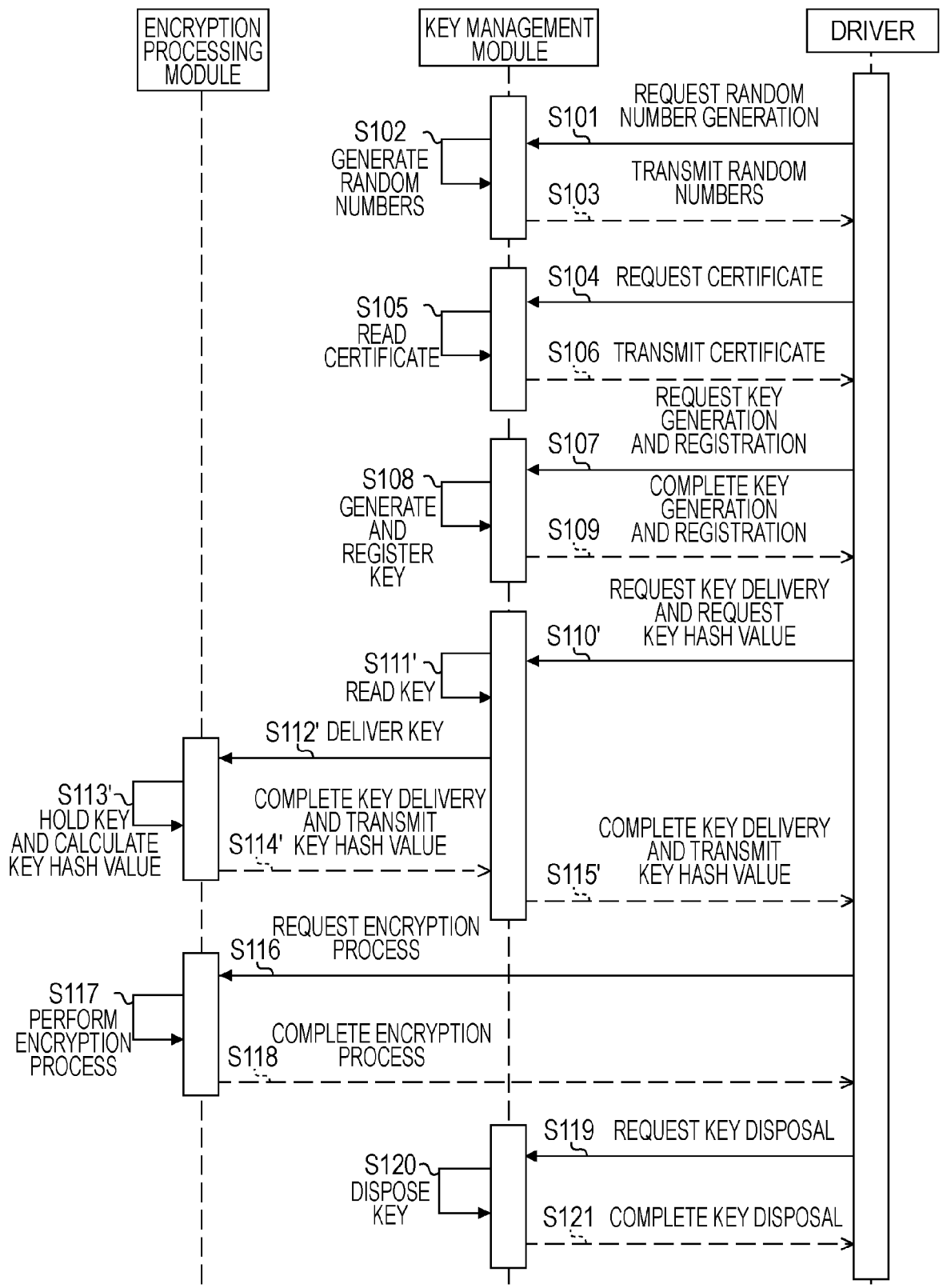
FIG. 13 illustrates a sequence of data transmission and reception among the control program on the CPU, the key management module, and the encryption and decryption processing module according to the second embodiment of the present invention.

FIG. 13 illustrates a sequence of the data transmission and reception performed among the control program 301 on the CPU 2, the key management module 5, and the encryption and decryption processing module 6 according to the present embodiment of the present invention. All of the steps of FIG. 13 are similar to the steps in FIG. 6, except for steps S110' to S115'.

Figure 12H:
Figure 12I:

In Step S110', the control program 301 transmits a datagram illustrated in FIG. 12H to the key management module 5. A command part of this datagram is a content for requesting the key delivery and the key hash value. In Step S111', as in the case of the previous embodiment, inside the key management module 5, the key management control unit 24 reads the key corresponding to the entry number from the memory 8 to generate a datagram illustrated in FIG. 12I.

Then, in Step S112', the datagram is transmitted via the dedicated communication channel 204 to the encryption and decryption processing module 6. This datagram has a difference as compared with the case of the key delivery according to the previous embodiment in that the command part is only a content for requesting the key delivery and the key hash value.

Next, in Step S113', in the encryption and decryption processing module 6, the key management control unit 35 holds the key data included in the received datagram and at the same time sends the key data to a hash processing unit 34 via the signal line 312. The hash processing unit 34 takes the key data part from the datagram to find out the hash value. Then, a datagram illustrated in FIG. 12J is generated and sent via the signal line 313 to the command control unit 32. The command control unit 32 sends the datagram as it is via the signal line 314 to the key management control unit 35.

In Step S114', the key management control unit 35 sends the datagram illustrated in FIG. 12J via the dedicated communication channel 205 to the key management module 5. In Step S115', in the key management module 5, the key management control unit 24 receives this datagram and sends the datagram via the signal line 211 to the command control unit 22. Then, similar to the previous embodiment, a datagram illustrated in FIG. 12K is sent to the control program 301 from the key management module 6.

In this manner, the control program 301 recognizes the completion of the key delivery, and it is possible to obtain the hash value of the key data after the key delivery.

Figure 14:
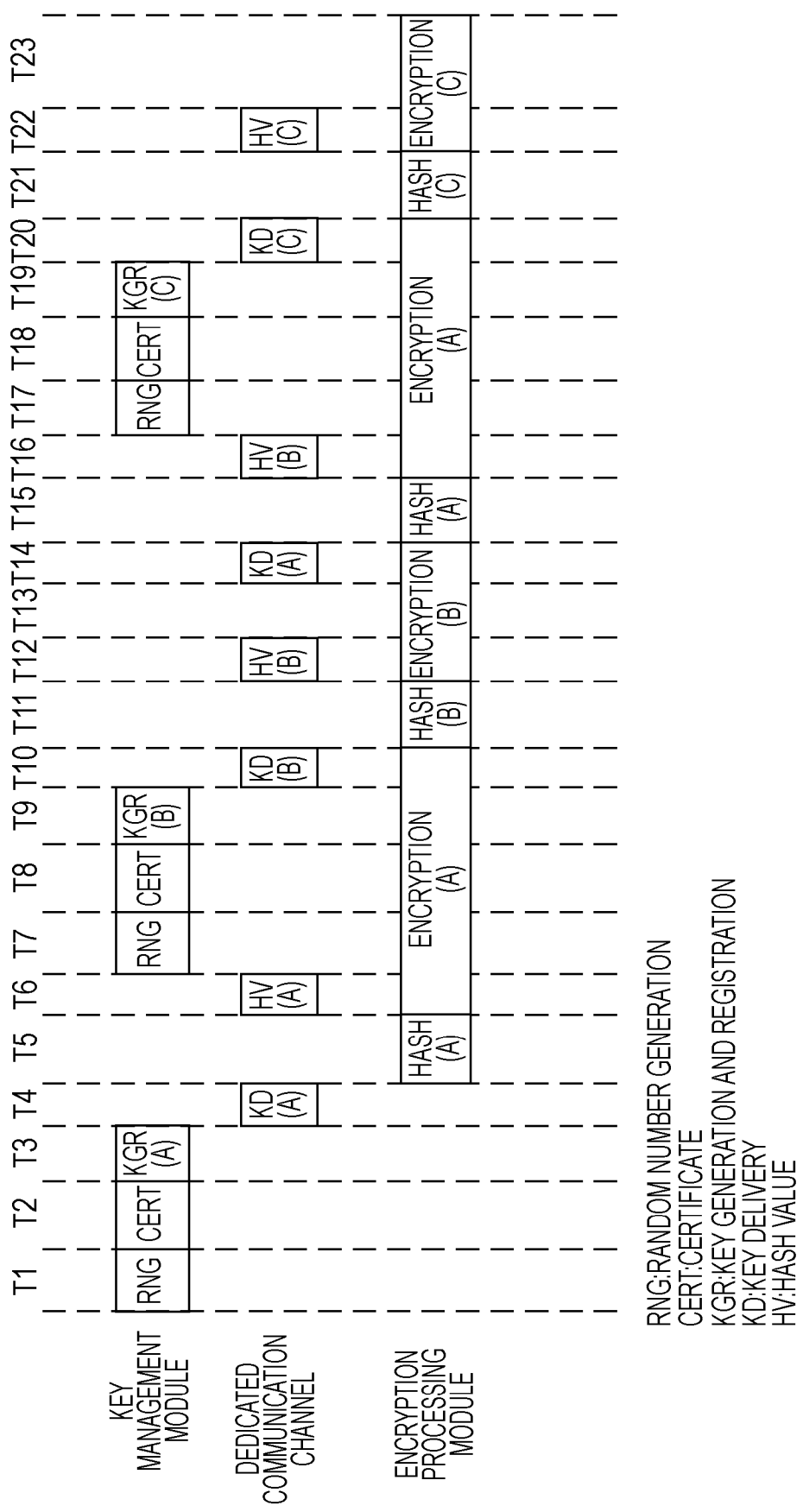
FIG. 14 illustrates detailed timings at which the communication encryption processing apparatus performs an encryption communication with plural partners according to the second embodiment of the present invention.

FIG. 14 illustrates timings at which the communication encryption processing apparatus performs an encryption communication with plural partners according to the present embodiment.

In this drawing, from T1 to T3, for the encryption communication with the external apparatus A, the sequence in Steps S101 to S109 illustrated in FIG. 13 is performed. At T4, the sequence in Steps S110' to S112' is performed. At T5, Step S113' is performed. At T6, Steps S114' and S115', and Steps S116 and S117 are performed in parallel.

A datagram representing the hash value of the key obtained in Step S113' and completion of the key delivery is transmitted to the control program 301. At the same time, the processed data is read from the work memory 3 to perform the encryption and decryption process and the encrypted data is sequentially written on the work memory 3.

From T7 to T9, while the encryption and decryption process for the encryption communication with the external apparatus A is continuously performed, the sequence in Steps S101 to S109 illustrated in FIG. 13 is performed for the encryption communication with the external apparatus B.

At T10, while the key delivery that is the sequence in Steps S110' to S112' for the encryption communication with the external apparatus B is performed, the encryption communication with the external apparatus A for the encryption and decryption process is continuously performed.

At T11, similar to T5, Step S113' is performed for the encryption communication with the external apparatus B. At T12, Steps S114' and S115', and Steps S116 and S117 are performed in parallel for the encryption communication with the external apparatus B. At T13, the encryption and decryption process for the encryption communication with the external apparatus B is continuously performed.

At T14, while the key delivery that is the sequence in Steps S110' to S112' for the encryption communication with the external apparatus A is performed, the encryption and decryption process for the encryption communication with the external apparatus B is continuously performed. At T15, similar to T5, Step S113' is performed. At T16, similar to T6, Steps S114' and S115', and Steps S116 and S117 are performed in parallel.

From T17 to T19, while the encryption and decryption process for the encryption communication with the external apparatus A is continuously performed, the sequence in Steps S101 to S109 illustrated in FIG. 13 for the encryption communication with the external apparatus C is performed.

At T20, while the key delivery that is the sequence in Steps S110' to S112' for the encryption communication with the external apparatus C is performed, the encryption and decryption process for the encryption communication with the external apparatus A is continuously performed. At T21, similar to T5, Step S113' is performed for the encryption communication with the external apparatus C. At T22, for the encryption communication with the external apparatus C, Steps S114' and S115', and Steps S116 and S117 are performed in parallel.

At T23, the encryption and decryption process for the encryption communication with the external apparatus C is continuously performed.

In addition, regarding the encryption process request as well, by preparing the command requesting the hash value of the key, the control program 301 can obtain the hash value of the key used during the execution of the encryption process through a similar procedure. Then, it is possible to check whether the hash values of the keys obtained during the key delivery and the encryption process are matched to each other and whether or not the hash value is different from that of a key of another entry number. Moreover, without directly dealing with the key data itself, it is possible to confirm whether the desired processes are performed in the key management module and the encryption and decryption processing module.

As described above, by using the dedicated communication channel between the key management module and the encryption and decryption processing module, the encryption and decryption processing module calculates the hash value of the key to allow the control program on the CPU to read the hash value. For this reason, the control program does not deal with the key data itself, and it is possible to check whether the desired processes are performed.

The scope of the present invention also includes the case where software program code for implementing the features of the above-described embodiments is supplied to a computer (a CPU or a microprocessor unit (MPU)) of an apparatus or system connected to various devices such that the devices can be operated to implement the features of the above-described embodiments, and the devices are operated according to the program stored in the computer of the system or apparatus.

In this case, the software program code itself implements the features of the above-described embodiments, and the program code itself and a device for supplying the program code to the computer, such as a recording medium storing the program code, constitute an embodiment of the present invention. Recording media storing the program code include, but are not limited to, a floppy disk, a hard disk, an optical disk, a magneto-optical disk, a compact disk read-only memory (CD-ROM), a magnetic tape, a non-volatile memory card, and a ROM.

The features of the above-described embodiments are implemented by the computer executing the supplied program code. Further, in the case where the program code cooperates with an operating system (OS) running on the computer or other application software to implement the features of the above-described embodiments, the program code is included in an embodiment of the present invention.

The present invention may also include the case where the supplied program code is stored in a memory of a function expansion board of the computer, and thereafter a CPU included in the function expansion board executes part or the entirety of actual processing in accordance with an instruction of the program code, whereby the features of the above-described embodiments are implemented.

Further, the present invention may also include the case where the supplied program code is stored in a memory of a function expansion unit connected to the computer, and thereafter a CPU included in the function expansion unit executes part or the entirety of actual processing in accordance with an instruction of the program code, whereby the features of the above-described embodiments are implemented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-215965 filed Aug. 8, 2006, which is hereby incorporated by reference herein in its entirety.

What is claimed is:

1. A communication encryption processing apparatus, the apparatus comprising:
    an interface configured to input and output data;
    a first storage unit configured to store data;
    an encryption and decryption processing module configured to read data stored in the interface or the first storage unit to perform an encryption or decryption process or generate a message authentication code, wherein a result of the encryption process, decryption process, or message authentication code is stored in the first storage unit;
    a key management module configured to generate a key and provide the key to the encryption and decryption processing module;
    a bus configured to be connected with the interface, the first storage unit, the encryption and decryption processing module, and the key management module;
    a second storage unit configured to store information used when a key is generated by the key management module, wherein the second storage unit is connected to the key management module and not connected to the bus;
    a third storage unit configured to store the key generated by the key management module, wherein the third storage unit is connected to the key management module and not connected to the bus; and
    a dedicated signal line configured to deliver the key generated by the key management module to the encryption and decryption processing module, the dedicated signal line being provided between the key management module and the encryption and decryption processing module, wherein the dedicated signal line is not connected to any of the bus, the interface, and the first storage unit.

2. The communication encryption processing apparatus according to claim 1, wherein after the key is provided to the encryption and decryption processing module, a datagram indicating that the key was delivered is transmitted from the encryption and decryption processing module to the key management module.

3. A communication encryption processing apparatus, the apparatus comprising:
    an interface configured to input and output data;
    a first storage unit configured to store data;
    an encryption and decryption processing module configured to read data stored in the interface or the first storage unit to perform an encryption or decryption process or generate a message authentication code, wherein a result of the encryption, decryption, or message authentication code is stored in the first storage unit;

a key management module configured to generate and provide a key to the encryption and decryption processing module;

a bus configured to be connected with the interface, the first storage unit, the encryption and decryption processing module, and the key management module;

a second storage unit configured to store information used when a key is generated by the key management module, wherein the second storage unit is connected to the key management module and not connected to the bus;

a third storage unit configured to store the key generated by the key management module, wherein the third storage unit is connected to the key management module and not connected to the bus; and a dedicated signal line configured to deliver, to the key management module, the result of the encryption, decryption, or message authentication code obtained by the encryption and decryption processing module, the dedicated signal line being provided between the key management module and the encryption and decryption processing module, wherein the dedicated signal line is not connected to any of the bus, the interface, and the first storage unit.

* * * * *